Figure 1:
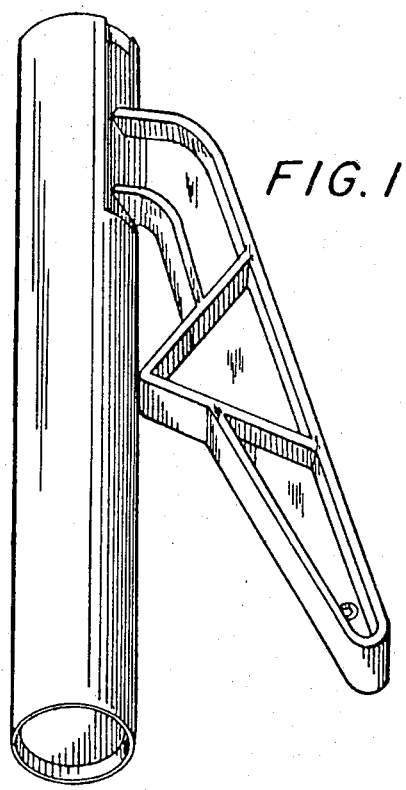

United States Patent [19]

Mohan et al.

[11] 4,379,320
[45] Apr. 5, 1983

[54] CHEMICAL LIGHTING DEVICE

[75] Inventors: Arthur G. Mohan, Somerville; Michael M. Rauhut, Bridgewater, both of N.J.

[73] Assignee: American Cyanamid Company, Stamford, Conn.

[21] Appl. No.: 235,863

[22] Filed: Feb. 19, 1981

[51] Int. Cl.³ .......................... F21K 2/06; C09K 11/07
[52] U.S. Cl. ............................ 362/34; 252/188.3 CL; 362/84
[58] Field of Search ................................. 362/34, 84; 252/188.3 CL

[56] References Cited

U.S. PATENT DOCUMENTS

| | | | |
|---|---|---|---|
| 3,875,602 | 4/1975 | Miron | 362/34 |
| 3,888,786 | 6/1975 | Maulding | 252/188.3 CL |
| 3,900,728 | 8/1975 | Holcombe | 362/34 |
| 4,086,183 | 4/1978 | Tatyrek | 252/188.3 CL |
| 4,186,426 | 1/1980 | Gingras | 362/34 |
| 4,193,109 | 3/1980 | Heffernan et al. | 362/34 |

FOREIGN PATENT DOCUMENTS 47-67033  6/1972  Japan .......................... 252/188.3 CL

*Primary Examiner*—Irwin Gluck
*Attorney, Agent, or Firm*—Gordon L. Hart

[57] ABSTRACT

In chemical light devices comprising a chemi-luminescent mixture with a first fluorescer contained in a transparent or translucent container, a second fluorescer is incorporated in the walls of the container to shift at least part of the emissions from the device from the shorter wavelength emission of the first fluorescer to a longer wavelength emission of the second fluorescer. The second fluorescer has an absorption spectrum substantially overlapping the emission spectrum of the first fluorescer. The shift is usually about 20 to 100 nanometers and may be as much as 200 nanometers.

7 Claims, 4 Drawing Figures

CHEMICAL LIGHTING DEVICE

The invention relates to improvements in chemical light devices of the kind comprising a liquid chemiluminescent mixture in a transparent or translucent container. The invention is useful with chemical lightsticks of the kind comprising an outer flexible sealed tube containing components of a chemiluminescent mixture separated by frangible means such as a glass vial or the like inside the tube. By bending the tube the frangible means is broken causing the components to mix and form a chemiluminescent mixture which emits light through the walls of the container.

Typically a chemiluminescent mixture comprises a chemiluminescer compound such as an oxalate diester which reacts with a peroxide component, usually hydrogen peroxide and a fluorescer compound which is activated by the chemiluminescent reaction. The best light efficiency with chemiluminescent mixtures has been obtained using fluorescers which emit in the yellow region of the visible spectrum. To obtain a red emission which is preferred in many situations where chemical light devices are particularly useful, a second fluorescer can be incorporated in the chemiluminescent mixture. The red fluorescer is activated by the primary fluorescer to emit red light. The efficiency of these mixtures has been unduly low, due probably to the fact the red fluorescer, e.g. Rhodamine B, or bis(phenylethynyl)tetracene, is unstable in the reaction mixture.

The present invention provides a container for a chemiluminescent mixture with a red fluorescer incorporated in the walls of the container so that the red fluorescer in the container wall can be activated by the light emitted from the chemiluminescent mixture without the need to have the fluorescer incorporated as a component of the chemiluminescent mixture. The red fluorescer in the container wall is not subject to decomposition due to instability in the chemiluminescent mixture yet it is exposed to light emitted from the primary fluorescer and is thereby activated to emit red light. It is not necessary that the red fluorescer must be in contact with the chemiluminescent mixture. In some embodiments the red fluorescer is incorporated in a plastic sleeve which surrounds the sealed tube.

The invention has been described by reference to yellow primary fluorescers and secondary fluorescers which emit red light. The invention is not limited to use of only fluorescers emitting those colors. The invention comprises the use of any combination of primary and secondary fluorescers having corresponding emission and absorption maxima. It was known to use secondary fluorescers in a chemiluminescent composition. The invention is advantageous in uses where the selected secondary fluorescer is incompatible with the chemiluminescent mixture which contains the primary fluorescer.

The primary fluorescer usually will be one having an emission maximum between 300 and 1,000 nanometers, and must be compatible with the other components of the chemiluminescent mixture. The secondary fluorescer usually will have an absorption maximum between 330 and 1100 nanometers and its absorption band must comprise a substantial portion of the emission band of the primary fluorescer, so that most of the emission from the primary can be used to activate the secondary.

The secondary fluorescer will emit light having a wavelength longer than that of the primary fluorescer. The light emitted by the second fluorescer could have a wavelength as much as 200 nanometers longer than its absorption maximum; more typically, however, the shift is usually in the range from about 20 to about 100 nanometers longer than its absorption maximum. The secondary fluorescer may emit in the visible spectrum or in the infrared spectrum. Similarly, the emission maximum of the primary fluorescer may be in the ultraviolet region while the secondary fluorescer emits in the visible spectrum.

Numerous fluorescer compounds having the abovedescribed properties are known. Many of these compounds are described in "Fluorescence and Phosphorescence" by Peter Pringsheim, Interscience Publishers, Inc., New York, N.Y., (1949), and "The Colour Index," Third Edition, Volume 4, The Society of Dyers and Colourists, and The American Association of Textile Chemists and Colorists (1971). Others are described in "Dye Lasers" by F. P. Schaefer, Editor, Springer Publishers, Berlin (1973), and "Eastman Laser Products." Publication JJ-169, Eastman Kodak Company, Rochester, N.Y. (1977).

Suitably paired sets of first (primary) and second (secondary) fluorescer compounds which can be used together in accordance with the invention include the following:

| First Fluorescer Compound | Second Fluorescer Compound |
| --- | --- |
| 9,10-bis(phenylethynyl)anthracene | 5,6,11,12-tetraphenylnaphthacene |
| 9,10-bis(phenylethynyl)anthracene | Acridine Orange (C.I. 46005) |
| 9,10-bis(phenylethynyl)anthracene | Disodium Fluorescein (C.I. 45350:1) |
| 1-chloro-9,10-bis(phenylethynyl)anthracene | Rhodamine B (C.I. 45170) |
| 1-chloro-9,10-bis(phenylethylnyl)anthracene | Rhodamine 6G Perchlorate |
| 2-chloro-9,10-bis(phenylethynyl)anthracene | 5,6,11,12-tetraphenylnaphthacene |
| 9,10-diphenylanthracene | 9,10-bis(phenylethynyl)anthracene |
| 9,10-diphenylanthracene | 3-(2'-benzothiazolyl)-7-N,N—diethylaminocoumarin |
| Perylene | 1-chloro-9,10-bis(phenylethynyl)anthracene |
| Pyrene | 1-chloro-9,10-bis(phenylethynyl)anthracene |
| Perylene | Disodium Fluorescein |
| 5,12-bis(phenylethynyl)tetracene | 16-17-dipeptaonyloxyviolanthrone |
| 16,17-dipaptanoyloxyviolanthrone | diethyloxatricarbocyanine |

In our most preferred embodiment, the first fluorescer compound is 1-chloro-9,10-bis(phenylethynyl)anthracene, and the second fluorescer compound is Rhodamine B.

It is not necessary to include a separate first fluorescer compound if the chemiluminescer compound itself is, or becomes, the first fluorescer. For example, if the chemiluminescer compound is the oxalic acid ester of 2-naphthol-3,6,8-trisulfonic acid that compound itself becomes the first fluorescer so that a separate first fluorescer compound is not required to obtain chemiluminescence.

The second fluorescer compound is incorporated into a suitable polymeric material, preferably a polyolefin, at about 1–10% by weight, preferably about 6% by weight, based on the weight of the polymeric material. This may be accomplished by any of the various procedures known in the art for such purpose, such as dry blending the fluorescer with a polyolefin in powder or granular form, followed by milling, Banbury mixing, molding, casting, extruding, and the like, to obtain a flexible container or a wrap or sleeve which can surround the container. The concentration of the second fluorescer will depend on the thickness of the container wall or the sleeve. For example, similar results are obtained using 3% by weight of fluorescer in a 12-mil film or wall as with 6% by weight of the same fluorescer in a 6-mil film or wall.

When the second fluorescer compound is incorporated in a cylindrical sleeve, the sleeve should be large enough that the outer container will fit snugly inside the sleeve. The sleeve should be long enough to cover the entire length of the outer tube wall.

Optionally, a plastic film containing the second fluorescer compound may be wrapped against the outer wall of the container. A number of layers of film may be wrapped around the outer tube to obtain a desired concentration of second fluorescer in the film surrounding the container.

Upon activation of the device, it may be used in conjunction with a reflective device, such as disclosed in U.S. Pat. No. 4,184,193 to increase the desired signal effect.

The following examples are illustrative of the present invention. All parts are by weight unless otherwise indicated.

EXAMPLE 1

A. Preparation of Chemiluminescer Component

This component is prepared by dissolving 135.4 grams (0.20 mole) of bis(6-carbopentoxy-2,4,5-trichlorophenyl)oxalate (see Example XXVI of U.S. Pat. No. 3,749,679) in 800 mls of high quality dibutyl phthalate and heating the solution at 150° under nitrogen for one hour. The solution is then cooled under nitrogen to 80°–90° and 3.83 grams (0.009 mole) of a first fluorescer compound, 1-chloro-9,10-bis(phenylethynyl)anthracene (see Example 5 of U.S. Pat. No. 3,911,038), are added thereto. The mixture is cooled to room temperature and diluted to a total volume of one liter by adding dibutyl phthalate thereto.

B. Preparation of Peroxide Component

A mixture of 773 mls of dimethyl phthalate, 212 mls of tertiarybutanol and 0.48 gram (0.003 mole) of sodium salicylate is stirred at room temperature to obtain a clear solution. Fifty-three grams (1.52 moles) of hydrogen peroxide (98%) are weighed in an open beaker and slowly added to the stirred mixture. The solution is then stirred at room temperature for one hour and transferred to a N-51A glass container.

C. Preparation of Device

Seven and a half milliliters of the chemiluminescer component of A are added through the open end of a cylindrical polyethylene tube which is sealed at the other end. The polyethylene tube has an outside diameter of about 15 mm, a wall thickness of about 2 mm, and an overall length of about 145 mm. The sealed glass tube, containing the peroxide component of B, is inserted in the polyethylene tube and a polyethylene plug is inserted in the open end and spin welded therein to close and seal the polyethylene tube. The overall length of the sealed polyethylene tube is about 150 mm.

EXAMPLE 2

Preparation of Film Containing Second Fluorescer Compound

A polyethylene film, containing 6% by weight real of a second fluorescer, is prepared by mixing 31.6 parts by weight of Day-Glo ® Rocket Red Z-13 (Day-Glo Color Corp., Cleveland, Ohio), a concentrate containing 25% by weight of fluorescer in polyethylene, with 100 parts by weight of low density polyethylene (Union Carbide, DFGA 0742). The mixture is blended by milling on a heated roll for 4 minutes at 150° C. and sheeted off the mill. The sheeted material is then compression molded at 200° C. between aluminum plates to form a film 3 mils in thickness.

In the manner described above, 15.8 parts by weight of the Day-Glo ® Rocket Red Z-13 concentrate are blended with 100 parts by weight of low density polyethylene and the mixture is compression molded to provide a cylindrical tube having a wall thickness of 12 mils, an inside diameter of about 15.1 mm, and a second fluorescer concentration of 3% by weight.

EXAMPLE 3

The film prepared in Example 2 is wrapped around the device prepared in Example 1. The device is then activated by bending the outer tube to rupture the inner tube, and shaking the contents. The emission intensity is then measured with a Brightness Meter (Hoffman Engineering, Stamford, Conn.), and the spectral distribution of the emitted light is determined on a spectroradiometer, as described by Roberts and Hirt, Appl. Spectroscopy, 21, 250 (1967), with one, two, and four layers of film around the outer tube. With only one layer of film considerable yellow light (520–560 mm) is transmitted through the film. As the film thickness is increased by wrapping additional layers around the tube the yellow emission is progressively decreased until it is all absorbed by the four-layer covering (12 mils).

Substituting the 12 mil thick cylindrical tube of Example 2 for the polyethylene film wrap gives a spectral distribution similar to four layers of the 3-mil thick film of Example 2.

EXAMPLE 6–8

Devices are prepared in the manner of Example 1 utilizing 0.004 mole of 9,10-diphenylanthracene, 0.003 mole of 9,10-bis(phenylethynyl)anthracene, and 0.003 mole of perylene, respectively, as the first fluorescer compound.

Films are also prepared in the manner of Example 2 utilizing 3 parts by weight of 9,10-bis(phenylethynyl)anthracene, disodium fluorescein, and 1-chloro-9,10-bis(phenylethynyl)anthracene, respectively, as the second fluorescer, and 100 parts by weight of polyethylene.

The devices are activated and the chemiluminescence emission maxima are determined before and after wrapping the polyethylene film around the device. The results obtained are shown below:

| Example | First Fluorescer | Second Fluorescer | Emission Wrapping (nm) | |
|---|---|---|---|---|
| | | | Without Wrapping | With Wrapping |
| 6 | 9,10-diphenylanthracene | 9,10-bis(phenylethynyl)anthracene | 430 | 475,510 |

-continued

| Example | First Fluorescer | Second Fluorescer | Emission Wrapping (nm) Without Wrapping | With Wrapping |
| --- | --- | --- | --- | --- |
| 7 | 9,10-bis-(phenyl-ethynyl)-anthracene | disodium fluorescein | 475,510 | 530 |
| 8 | perylene | 1-chloro-9,10-bis(phenyl-ethynyl)-anthracene | 470 | 530 |

EXAMPLE 9

A polyethylene sheet, containing 5% by weight of a second fluorescer, is prepared by mixing 20 parts by weight of Day-Glo ® Rocket Red S-13, with 80 parts by weight of low density polyethylene, as described in Example 1. The sheeted material is then compression molded to form tubes about 145 mm long, having an outside diameter of about 15 mm and a wall thickness of about 2 mm, and sealed at one end.

Several devices are then prepared and sealed, as described in Example 1 but using the tubes prepared with the second fluorescer in the tube walls. Activation of the device by bending the outer tube to rupture the inner tube, and shaking the contents, results in the emission of a deep red light.

The results obtained with three samples are shown below wherein the reaction mixture initially contained 0.13 M bis(6-carbopentoxy-2,4,5-trichlorophenyl)oxalate, 0.005 M-1-chloro-9,10-bis(phenylethynyl)anthracene, 0.375 M hydrogen peroxide, and $1.56 \times 10^{-4}$ M sodium salicylate in a solvent mixture consisting of 75% by volume of dibutyl phthalate, 20% by volume of dimethylphthalate, and 5% by volume of t-butanol.

| Light Capacity[1] | $T_{.75}$[2] | Quantum Yield × $10^{2}$[3] | Intensity vs Time (mins.)[4] | | | | | |
| --- | --- | --- | --- | --- | --- | --- | --- | --- |
| | | | 0 | 2 | 10 | 30 | 60 | 120 |
| 173 | 228 | 10.3 | 823 | 237 | 79.8 | 57.2 | 37.8 | 20.7 |
| 177 | 248 | 10.5 | 837 | 244 | 80.9 | 58.2 | 37.8 | 20.4 |
| 165 | 193 | 9.8 | 816 | 237 | 79.8 | 57.8 | 39.4 | 20.9 |

[1] Intergrated light output in lumen-hours per liter
[2] Time in minutes required for 75% of the total light to be emitted
[3] Quantum yield in einsteins per mole
[4] Light intensity in lumens per liter

EXAMPLE 10

In the manner of Example 9, utilizing 2.5% by weight real of the second fluoroescer, the following results are obtained.

| Light Capacity | $T_{.75}$ | Quantum Yield × $10^{2}$ | Intensity vs Time (mins.) | | | | | |
| --- | --- | --- | --- | --- | --- | --- | --- | --- |
| | | | 0 | 2 | 10 | 30 | 60 | 120 |
| 230 | 205 | 11.3 | 1100 | 309 | 104 | 80.9 | 53.2 | 29.2 |
| 233 | 205 | 11.4 | 1060 | 309 | 107 | 81.8 | 55.8 | 30.4 |
| 237 | 174 | 11.6 | 1070 | 348 | 116 | 89.0 | 58.4 | 31.2 |

The invention can be used with chemical light devices of several kinds having containers different from the lightstick configuration described in the examples.

Figure 2:
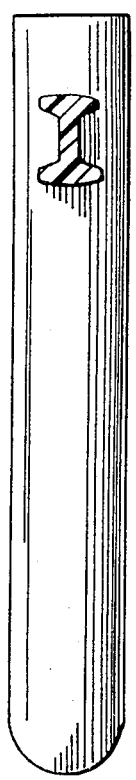
Figure 3:
Figure 4:
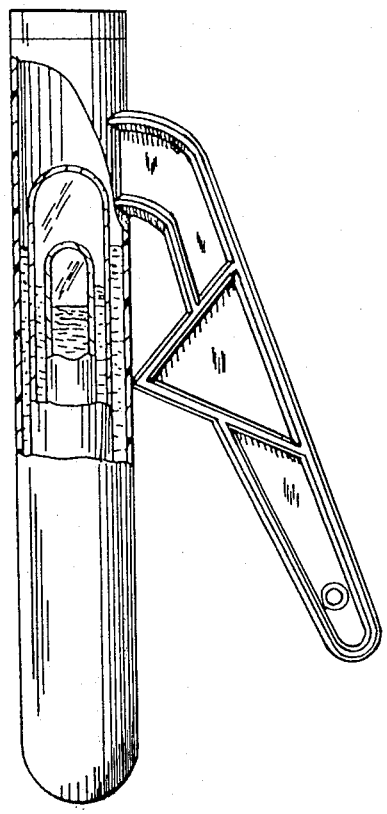

The drawings illustrate a chemiluminescent lightstick which was described in U.S. Pat. No. 4,193,109. FIG. 1 shows a chemiluminescent lightstick with attached lever and fulcram, encased in a sleeve. FIG. 2 shows the tube of the lightstick with the lever cut away and FIG. 3 shows the sleeve apart from the lightstick. FIG. 4 shows interior contents of a lightstick with several components of the chemiluminescent mixture separated by glass vials inside the outer tube.

Referring now to the drawings a device embodying the present invention would have the second fluorescer dispersed in the polyolefin material from which the outer tube of the container device is made, i.e. the tube shown in FIG. 2. Alternatively the second fluorescer could be dispersed in the plastic resin from which a sleeve is made as shown in FIG. 3 to slip over the length of the tube as shown in FIG. 1. The first fluorescer would be in one of the components inside the tube as illustrated in FIG. 4.

In other embodiments of the invention, the second fluorescer could be dispersed in tubing or a wrap for tubing through which is circulated a chemiluminescent mixture which comprises the first fluorescer. Other embodiments with variations of the container configuration can be made within the scope of the invention.

We claim:

1. A chemical light device comprising a chemiluminescent mixture with a first fluorescer activated by reaction of a chemiluminescer compound with a peroxide component, all contained inside a transparent or translucent container, a second fluorescer incorporated in the walls of the container or in a wrap surrounding the container, said second fluorescer having an emission maximum at a longer wavelength than that of the first fluorescer and having an absorption spectrum overlapping a substantial portion of the emission spectrum of the first fluorescer.

2. A chemical light device defined by claim 1 wherein the defined second fluorescer is dispersed in polyolefin constituting the walls of a tube containing the defined chemiluminescent mixture.

3. A chemical light device defined by claim 1 wherein the defined second fluorescer is dispersed in a polyolefin sleeve surrounding a tube which contains the chemiluminescent mixture.

4. A chemical light device defined by claim 1 wherein the defined first fluorescer is 1-chloro-9,10-bis(phenylethynyl)anthracene and the second fluorescer is Rocket Red Z-13.

5. A chemical light device defined by claim 1 wherein the first fluorescer is 9,10-diphenylanthracene and the second fluorescer is 9,10-bis(phenylethynyl)anthracene.

6. A chemical light device defined by claim 1 wherein the first fluorescer is 9,10-bis(phenylethynyl)anthracene and the second fluorescer is disodium fluorescein.

7. A chemical light device defined by claim 1 wherein the first fluorescer is perylene and the second fluorescer is 1-chloro-9,10-bis(phenylethynyl)anthracene.

* * * * *